(12) United States Patent
Reichel et al.

(10) Patent No.: US 8,489,281 B2
(45) Date of Patent: Jul. 16, 2013

(54) METHOD FOR OPERATING AN AUTOMOBILE AND AN AUTOMOBILE WITH AN ENVIRONMENTAL DETECTION DEVICE

(75) Inventors: Michael Reichel, Ingolstadt (DE); Reimund Limbacher, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/307,620

(22) Filed: Nov. 30, 2011

(65) Prior Publication Data

US 2012/0303217 A1 Nov. 29, 2012

(30) Foreign Application Priority Data

Dec. 1, 2010 (DE) .......................... 10 2010 053 156

(51) Int. Cl.
*B62D 1/00* (2006.01)
*B62D 1/16* (2006.01)
*G06G 7/76* (2006.01)
*G08G 1/00* (2006.01)
*G01C 21/00* (2006.01)

(52) U.S. Cl.
USPC .......................................... 701/41; 701/301

(58) Field of Classification Search
USPC .......................................... 701/300–302, 41
See application file for complete search history.

(56) References Cited

U.S. PATENT DOCUMENTS

| 7,040,653 | B1 * | 5/2006 | Breed | 280/731 |
|---|---|---|---|---|
| 7,080,855 | B2 * | 7/2006 | Muller | 280/777 |
| 2004/0193374 | A1 * | 9/2004 | Hac et al. | 701/301 |
| 2005/0203705 | A1 | 9/2005 | Izumi et al. | |
| 2008/0314188 | A1 * | 12/2008 | Frasch et al. | 74/492 |
| 2009/0192710 | A1 * | 7/2009 | Eidehall et al. | 701/301 |

FOREIGN PATENT DOCUMENTS

| DE | 19952227 B4 | 9/2000 |
|---|---|---|
| DE | 102006044179 A1 | 9/2007 |
| DE | 102007016799 B4 | 10/2008 |
| DE | 102008008182 A1 | 10/2009 |

* cited by examiner

*Primary Examiner* — Mary Cheung
*Assistant Examiner* — Atul Trivedi
(74) *Attorney, Agent, or Firm* — Henry M. Feiereisen LLC

(57) ABSTRACT

A method for operating an automobile includes the steps of a) detecting an object in an environment of the automobile with an environmental detection device; b) evaluating a collision risk of the automobile with the object; and c) depending on the evaluation, adjusting the steering angle of the automobile with a steering angle actuating device. The steering wheel is decoupled with the decoupling device depending on the adjustment performed in step c), so that the rotation of the steering wheel caused by the adjustment of the steering angle is smaller than if the same adjustment were made when the steering wheel is not decoupled.

9 Claims, 2 Drawing Sheets

METHOD FOR OPERATING AN AUTOMOBILE AND AN AUTOMOBILE WITH AN ENVIRONMENTAL DETECTION DEVICE

CROSS-REFERENCES TO RELATED APPLICATIONS

This application claims the priority of German Patent Application, Serial No. 10 2010 053 156.1, filed Dec. 1, 2010, pursuant to 35 U.S.C. 119(a)-(d), the content of which is incorporated herein by reference in its entirety as if fully set forth herein.

BACKGROUND OF THE INVENTION

The present invention relates to a method for operating an automobile with an environmental detection device, a steering angle actuating device, which is configured to adjust a steering angle independent of an operator, a steering wheel for manual adjustment of a steering angle of the automobile by an operator, and a decoupling device for at least partially decoupling a rotation of the steering wheel from an adjustment of the steering angle of the automobile caused by the steering angle actuating device, with the steps: a) detecting an object in the environment of the automobile with the environmental detection device; b) evaluating a collision risk of the automobile with the object; and c) depending on the evaluation, adjusting the steering angle of the automobile with the steering angle actuating device. The invention also relates to an automobile with an environmental detection device.

The following discussion of related art is provided to assist the reader in understanding the advantages of the invention, and is not to be construed as an admission that this related art is prior art to this invention.

Various driver assistance systems for assisting a vehicle operator with operating an automobile are known. For example, driver assist systems are known which assume transverse guidance tasks by applying additional steering torque on the steering system of the automobile. With this additional steering torque, the vehicle should be steered on a specified path commensurate with predetermined parameters. One example is the so-called heading control: this driver assistance system has the objective to control the vehicle so as to move along the center of the lane. A camera system with a connected image processing system measures the necessary environmental data. In addition, sensor data from the vehicle are evaluated (speed, transverse acceleration, etc.). The additional steering torque to be applied can be computed in a data processing device by using a suitable algorithm.

Driver assistance system for transverse guidance can be constructed as pure warning systems or as independently operating systems. The so-called LDW (Lane Departure Warning) uses vibration warning to warn the vehicle operator from leaving the lane, in particular in the vicinity of road boundaries. The so-called LDW plus system applies in addition a steering torque which returns the automobile to the lane. The underlying LDW algorithms are pure warning systems. The so-called HC (Heading Control Assist) systems are used to keep the vehicle in the center of the lane. The HC assist system includes a so-called fairway which represents a predetermined travel strip within which no active steering intervention occurs. The vehicle is controlled back into its original lane only after exceeding a certain distance from the lane center. This fairway is absent in the HC continuous system, so that steering interventions can be constantly felt on the steering wheel. The driver notices all interventions due to the rigid coupling of the steering wheel with the automatic steering system. With a continuous steering assist and the associated continuous steering interventions, the steering wheel appears to develop a live of its own.

It would therefore be desirable and advantageous to obviate prior art shortcomings and to provide an improved method and an automobile, which reduces dangerous situations for the vehicle operator and for other road users.

SUMMARY OF THE INVENTION

The invention relates to a method for operating an automobile with an environmental detection device which may be particularly configured as a sensor for detecting a vehicle environment.

According to one aspect of the present invention, a method for operating an automobile having an environmental detection device, a steering angle actuating device which is configured to adjust a steering angle of the automobile independent of an operator, a steering wheel for manually adjusting a steering angle of the automobile by an operator, and a decoupling device for at least partially decoupling a rotation of the steering wheel from an adjustment of the steering angle of the automobile caused by the steering angle actuating device, includes the steps of:
  a) detecting with the environmental detection device an object in an environment of the automobile;
  b) evaluating a collision risk of the automobile with the object; and
  c) depending on the evaluation of the collision risk, adjusting the steering angle of the automobile with the steering angle actuating device; and
  d) depending on the adjustment of the steering angle in step c), decoupling the steering wheel with the decoupling device, so that the rotation of the steering wheel caused by the adjustment of the steering angle is smaller than if an identical adjustment is made when the steering wheel is not decoupled.

When evaluating a collision risk of the automobile with the object detected by the environmental detection device, the evaluation may determine that the risk of a collision with the object is either affirmed or denied. In addition, a quantitative evaluation of the collision risk may also include determining a probability value for the collision.

The steering angle of the automobile may or may not be adjusted. If the steering angle is adjusted, the type and/or the degree of the adjustment can be made so as to depend on the evaluation, in particular on a quantitative evaluation value. In particular, the speed and/or rate of the adjustment can also depend on evaluation values.

Depending on the adjustment, the steering wheel may either be decoupled or not decoupled. In addition to completely decouple the steering wheel or not to decouple the steering wheel at all, the steering may be decoupled to a degree that depends on the type of the adjustment and/or of the associated adjustment values. In particular, the steering wheel may either not perform a rotation or such a rotation occurs always in the same direction as the adjustment of the steering angle, however with a maximum speed that corresponds to the speed with which the steering wheel would rotate if it were not decoupled.

The method allows an automobile to automatically evade potential collision objects in an emergency. The potential collision object and the automobile and its occupants are safely protected from accidents. Because such automatic emergency evasion maneuvers represent highly dynamic processes, rapid steering movements are generally required. If these interventions in the steering were automatic and the steering wheel were coupled like for manual steering, then jerky and rapid rotations would occur on the steering wheel. This could be problematic in that a vehicle operator who rests, for example, his thumb on the steering wheel could break his thumb due to the rapid rotations. A steering wheel acting nervously in this manner would significantly diminish the acceptance of emergency evasion systems. The proposed method eliminates these significant disadvantages. It enables significantly reduced rotary movements of the steering wheel even in dynamic and automatic emergency evasion maneuvers, so that the response of the steering wheel is not only viewed as being less intrusive, but the risk of injury to the vehicle operator is also significantly reduced.

According to an advantageous feature of the present invention, the degree of the decoupling in step d) depends on a speed of the adjustment of the steering angle and increases in particular with increasing speed of the adjustment. Alternatively or in addition, the degree of the decoupling in step d) may depend on the rate of the adjustment of the steering angle and may in particular increase with increasing rate of the adjustment. Moreover, the steering wheel may also be increasingly more decoupled the faster the steering wheel rotates and/or the faster it accelerates in particular in an emergency evasion situation, thus commensurately reducing its rotary movement. In this way, the rotary movement of the steering wheel can be adapted to the requirements of the respective vehicle steering characteristic. The faster the steering angle is adjusted, the faster would a non-decoupled steering wheel rotate and the greater would be the risk for a vehicle operator who rests his hands on the steering wheel. With increasing degree of the decoupling, the vehicle operator is therefore safely protected from injury to his hand and lower arm. The applied steering torque can be concealed on the steering wheel so that the driver senses an acceptable steering wheel movement and/or the steering wheel rotation speed stays within manageable parameters.

According to another advantageous feature of the present invention, the steering wheel may be completely decoupled in step d), so that the steering wheel does not perform a rotary movement during each adjustment of the steering angle. The hands of the vehicle operator are then well protected even with very rapid, jerky automatic steering movements.

According to another advantageous feature of the present invention, the steering wheel may not be decoupled in step d) when the steering angle is adjusted in step c) by a change steering angle which is smaller than a predetermined threshold value, whereas the steering wheel may be decoupled in step d) when the steering angle is adjusted in step c) by a change steering angle which is greater than or equal to the predetermined threshold value. For only small rotary movements of the steering wheel below the threshold value, the vehicle operator receives via the steering wheel a haptic feedback message which corresponds to a natural vehicle characteristic during a steering movement. Only when the adjustment angles become so large that the hands of the vehicle operator could be at risk, is the steering wheel decoupled for protecting the vehicle operator. This represents a good compromise between a natural driving characteristic and a protection of the vehicle operator. Decoupling for values greater than or equal to the predetermined threshold value may again be either complete or may have a level adapted to respective adjustment characteristics.

According to another advantageous feature of the present invention, the decoupling device may include a superposition device which has an actuator motor and in particular a gear and intervenes in the rotation of a steering column, which may be rotated by way of the steering wheel, through decoupling such that a rotation of the steering column caused by the steering angle actuating device results in a smaller rotation of the steering wheel than if the intervention had not taken place. This design ensures effective and reliable decoupling of the steering wheel and can also operate with sufficient speed for very rapid automatic steering movements in emergency evasion situations. A multi-step adjustment of the level of the decoupling is also possible.

According to another advantageous feature of the present invention, decoupling is implemented with a control device which is configured to control the steering angle actuating device so as to cause an adjustment of the steering angle of the automobile and which is configured to control the actuator motor depending on the control of the steering angle actuating device. This design ensures that the steering wheel can be decoupled almost without delay relative to the adjustment of the steering angle. The reaction times for the decoupling are kept small with respect to the start of the adjustment. Adjustment and decoupling can thus occur in a coordinated manner.

According to another advantageous feature of the present invention, the steering wheel may always be decoupled with the decoupling device when the steering angle of the automobile is adjusted with the steering angle actuating device. An undesirable rotary movement of the steering wheel is thus prevented even if a collision risk is not present in the case of an automatically performed transverse guidance. In particular, when a driver assistance system completely takes over the steering task from the driver, no intrusive interventions in the steering wheel occur. This improves the driving comfort and the bodily stress for the vehicle operator.

According to another advantageous feature of the present invention, the environmental detection device may include a distance sensor and/or an ultrasound sensor and/or a camera and/or a radar sensor and/or a lidar sensor. This type of sensors or detectors ensures reliable detection of an object in step a) of the method and enables high-quality evaluation in step b).

According to another aspect of the invention, an automobile according to the invention includes an environmental detection device which is configured to detect an object in the environment of the automobile, a steering angle actuating device which is configured to adjust a steering angle of the automobile independent of an operator, a steering wheel for manual adjustment of a steering angle of the automobile by an operator, a decoupling device for at least partially decoupling a rotation of the steering wheel from an adjustment of the steering angle of the automobile caused by the steering angle actuating device, and a data processing device which is configured to evaluate a collision risk of the automobile with the object detected by the environmental detection device and to set an adjustment of the steering angle of the automobile depending on the evaluation. The data processing device is further configured to set, depending on the set adjustment, a decoupling of the steering wheel with the decoupling device such that a resulting rotary movement of the steering wheel during execution of the set adjustment of the steering angle is smaller than if the same adjustment would be made when the steering wheel is not decoupled. The data processing device may particularly be incorporated in a driver assistance system of an automobile and may also include a control device configured to control the steering angle actuating device and/or an actuator motor of the decoupling device.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
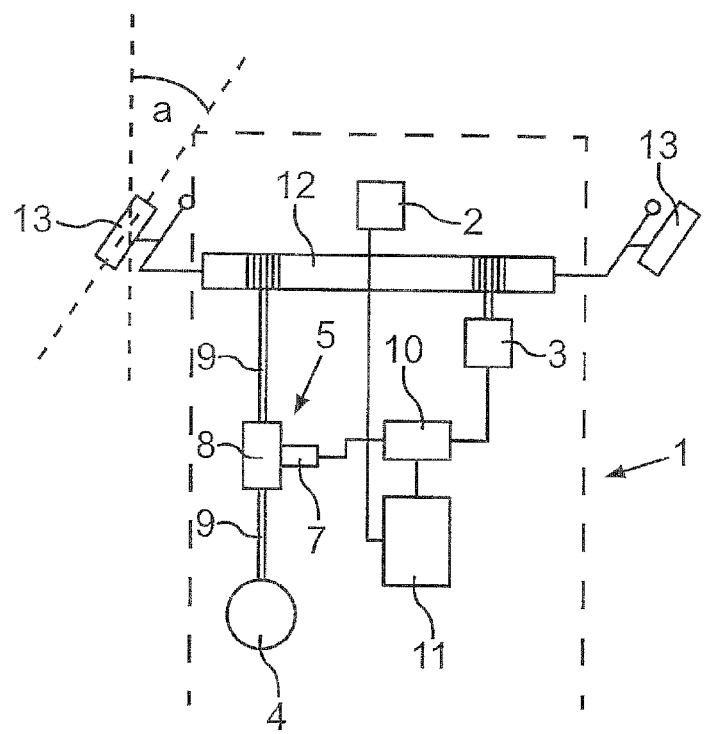
FIG. 1 shows a schematic diagram of an automobile with a steering angle actuating device and a decoupling device according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a front region of an automobile 1 in a schematic top view. A steering rack 12 allows the two front wheels 13 of the automobile 1 to be steered. The steering rack 12 is connected via a control rod 9 with a steering wheel 4 to allow manual steering by a vehicle operator. A rotary movement performed by the vehicle operator on the steering wheel 4 is transmitted to the steering rack 12 and finally to the wheels 13, allowing a steering angle a to be set.

In addition, the automobile 1 includes a steering angle actuating device capable of automatically applying additional steering torque to the steering system. In the exemplary embodiment, the steering angle actuating device is implemented as an electric servo steering (Electric Power Steering) EPS 3. The EPS 3 includes a motor and a gear for transmitting a force to the steering rack 12. Forces introduced in this manner affect the wheels 13 and cause the steering angle a to change. The forces simultaneously also act on the steering wheel 4. The connection between the steering rack 12 and the steering wheel 4 via the control rod 9 has a fixed geometry with systems lacking superposition steering (i.e., the gear ratio is constant). Each displacement of the steering rack 12 would then simultaneously also cause the steering wheel 4 to rotate.

A superposition steering 5 allows an adaptation of the steering gear ratio from the steering wheel 4 to the steering rack 12. The superposition steering 5 can be used to disguise interventions by the EPS 3 on the steering wheel 4. To this end, the superposition steering 5 includes a gear 8 and an actuator motor 7. The superposition steering 5 is connected with a control device 10, to which the EPS 3 is also connected. When the motor of the EPS 3 is controlled by the control device 10, the actuator motor 7 of the superposition steering 5 is activated to the same degree to disguise the steering movements on the steering wheel 4 caused by the EPS 3. The gear ratio of the two ends of the control rod 9 can be adapted by the gear 8, so that the desired rotation of the steering wheel 4 can be adjusted. However, the steering wheel 4 can also be completely decoupled, so that it no longer rotates for any movement of the steering rack 12.

The control device 10 is connected with a computer 11 providing driver assistance in form of automatic transverse guidance. The computer 11 is particularly configured to provide transverse guidance assistance in form of a lane maintaining support system or a lane assist. Based on a predetermined algorithm, the computer 11 determines interventions in the steering system 9 and accordingly controls the control device 10, which then controls the EPS 3 and the superposition steering 5 so as to implement the commands of the computer 11.

The computer 11 also includes an algorithm capable of executing a method for automatic emergency evasion maneuvers. For this purpose, the computer 11 is connected with an environmental detection device in form of a distance sensor 2.

Figure 2:
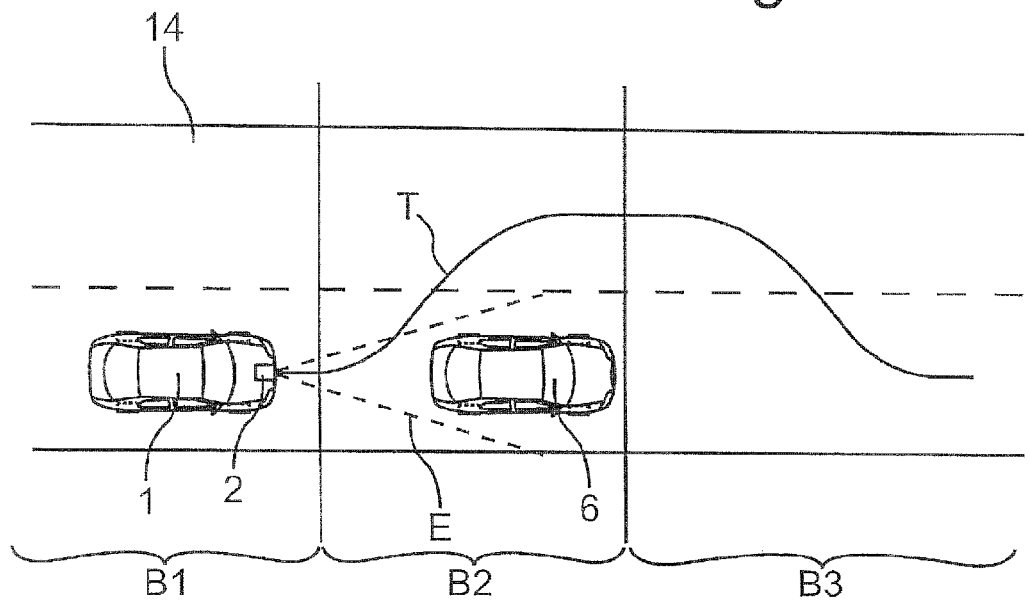
FIG. 2 shows a schematic diagram of an emergency evasion situation in traffic according to the invention.

FIG. 2 shows in a schematic top view onto a roadway 14, with the automobile 1 moving in the right lane in a travel direction (in the Figure, from left to right). An additional automobile 6 is located on the lane in front. A possible scenario for an emergency evasion situation will now be illustrated, describing the steering reaction of the automobile 1: the automobile 6 suddenly brakes and finally comes to a stop. The automobile 6 thus represents a potential collision object for the automobile 1 which is still moving. Because a normal driving situation originally existed, decoupling of the steering wheel 4 from the steering rack 12 was not necessary in section B1. The operator of the automobile 1 can manually operate the steering without restrictions and receives intermediate feedback on the steering wheel 4 about the set steering angle a.

The automobile 6 is located in the detection region E of the distance sensor 2. The distance sensor 2 recognizes that the distance between the automobile 1 and the automobile 6 becomes increasingly smaller and transmits the data to the computer 11. An algorithm executed in the computer 11 evaluates the collision risk of the automobile 1 with the automobile 6 and comes to the conclusion that an automatic emergency evasion maneuver appears to be necessary to avoid an accident. A trajectory T is computed as well as an associated course of the steering angle a for realizing this trajectory T. To implement this computation, the computer 11 transmits suitable data to the control device 10 which then transmits suitable control signals to the EPS 3 for automatically adjusting the required steering angles a via the steering rack 12. Adaptive steering which is automatically implemented by the EPS 3 thus occurs in section B2.

To prevent a risk to the vehicle operator by a rapidly rotating steering wheel 4, the steering wheel 4 is in this exemplary embodiment in section B2 at least partially decoupled from the steering rack 12. The control device 10 hereby controls the actuator motor 7 so as to reduce the rotation of the steering wheel 4 by way of the gear 8. According to the trajectory T in section B2, the steering wheel 4 still performs a rotary movement; however, this rotary movement is significantly smaller than if decoupling had not taken place. The vehicle operator receives haptic feedback about the automatically performed steering operation by way of slow tracking of the steering wheel 4; however, his hands are no longer at risk from jerky movements of the steering wheel 4.

The steering wheel 4 is again completely coupled to the steering rack 12 in section B3 by suitable commands from the computer 11 only when a collision risk no longer exists. The vehicle operator can now manually steer back into the right lane.

Figure 3:
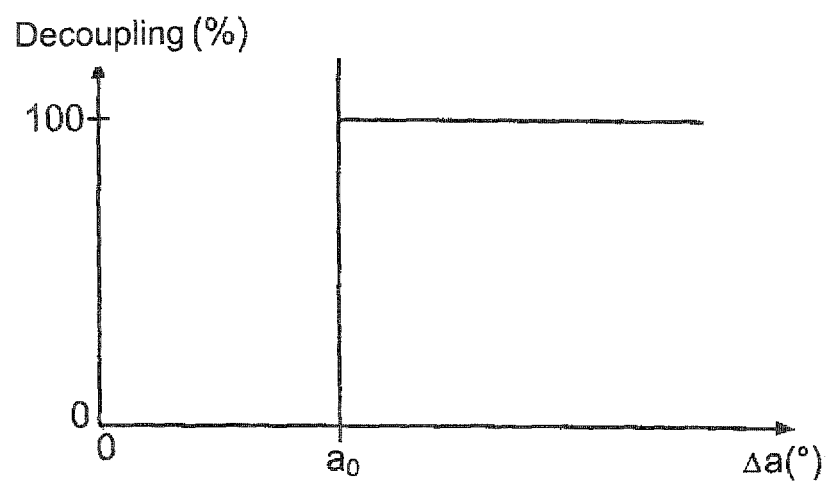
FIG. 3 shows a graphical representation of a threshold-dependent decoupling according to the invention.

FIG. 3 shows an alternative approach for decoupling. The degree of the decoupling as a function of the change steering angle $\Delta a$ in a graphical illustration. The steering wheel 4 is not decoupled at all before reaching a threshold value $a_0$. Complete decoupling only occurs when the change steering angle $\Delta a$ exceeds this threshold value $a_0$ and the steering wheel no longer co-rotates. In particular, the threshold value $a_0$ should be smaller than 360° to disguise dangerously fast multiple revolutions of the steering wheel.

In summary, with the presented idea of intelligent coupling of the EPS 3 and adaptive steering, both emergency evasion trajectories can be driven and the thumb of the vehicle operator can be protected. This is achieved by at least partially decoupling the steering wheel 4 at least during the automatic emergency evasion maneuver.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for operating an automobile having an environmental detection device, a steering angle actuating device which is configured to adjust a steering angle of the automobile independent of an operator, a steering wheel for manually adjusting a steering angle of the automobile by an operator, and a decoupling device for partially decoupling a rotation of the steering wheel from an adjustment of the steering angle of the automobile caused by the steering angle actuating device, the method comprising the steps of:
    a) detecting with the environmental detection device an object in an environment of the automobile;
    b) evaluating a collision risk of the automobile with the object; and
    c) depending on the evaluation of the collision risk, adjusting the steering angle of the automobile with the steering angle actuating device; and
    d) operating the decoupling device, to controllably reduce the rotation of the steering wheel in response to the adjustment of the steering angle in step c), while still enabling adjustment of the steering angle by the operator with the steering wheel.

2. The method of claim 1, wherein a degree of decoupling in step d) depends on a speed and/or a rate of adjustment of the steering angle.

3. The method of claim 2, wherein the degree of decoupling in step d) increases with increasing speed or rate of the adjustment.

4. The method of claim 1, wherein the steering wheel is not decoupled in step d) for an adjustment of the steering angle in step c) by a change steering angle that is smaller than a predetermined threshold value, and wherein the steering wheel is decoupled in step d) for an adjustment of the steering angle in step c) by a change steering angle that is greater than or equal to the predetermined threshold value.

5. The method of claim 1, wherein the decoupling device comprises a superposition device having an actuator motor and a gear, wherein the superposition device intervenes through decoupling in the rotation of a steering column rotated by the steering wheel, such that a rotation of the steering column caused by the steering angle actuating device results in a smaller rotation of the steering wheel than if the intervention had not taken place.

6. The method of claim 5, wherein decoupling is affected by a control device which is configured to control the steering angle actuating device so as to adjust the steering angle of the automobile and which is further configured to control the actuator motor depending on control of the steering angle actuating device.

7. The method of claim 5, wherein the steering wheel is decoupled with the decoupling device when the steering angle of the automobile is adjusted with the steering angle adjusting device.

8. The method of claim 1, wherein the environmental detection device comprises a device selected from the group consisting of a distance sensor, an ultrasound sensor, a camera, a radar sensor, and a lidar sensor.

9. An automobile comprising:
    an environmental detection device configured to detect an object in an environment of the automobile,
    a steering angle actuating device configured to adjust a steering angle of the automobile independent of an operator,
    a steering wheel for manual adjustment of a steering angle of the automobile by the operator,
    a decoupling device for partially decoupling a rotary movement of the steering wheel from an adjustment of the steering angle of the automobile caused by the steering angle actuating device, and
    a data processing device configured to evaluate a collision risk of the automobile with the object detected by the environmental detection device and to set an adjustment of the steering angle of the automobile depending on the evaluation of the collision risk,
    wherein the data processing device is configured to control, depending on the set adjustment of the steering angle, the partial decoupling of the steering wheel by the decoupling device such that a resulting rotary movement of the steering wheel during execution of the adjustment of the steering angle set by the data processing device is smaller than if the same adjustment were made when the rotary movement of the steering wheel is not decoupled.

* * * * *